United States Patent [11] 3,553,379

[72] Inventor Dirk J. Boomgaard
Monroeville, Pa.

[21] Appl. No. 742,249
[22] Filed July 3, 1968
[45] Patented Jan. 5, 1971
[73] Assignee Westinghouse Electric Corporation
Pittsburgh, Pa.
a corporation of Pennsylvania

[54] SIGNAL SEEKING FM STEREO SYSTEM
7 Claims, 3 Drawing Figs.

[52] U.S. Cl. .......... 179/15, 325/470, 325/471
[51] Int. Cl. .......... H04h 5/00
[50] Field of Search .......... 179/15ST; 325/471, 470

[56] References Cited
UNITED STATES PATENTS

| | | | |
|---|---|---|---|
| 3,467,872 | 9/1969 | Kasuga | 325/471 |
| 3,334,187 | 8/1967 | Pampel | 179/15 |
| 2,496,832 | 2/1950 | Wallace | 250/20 |

*Primary Examiner*—Kathleen H. Claffy
*Assistant Examiner*—Tom D'Amico
*Attorneys*—F. H. Henson, C. F. Renz and A. S. Oddi

ABSTRACT: A signal seeking system for use in an FM stereo multiplex receiver is disclosed wherein the receiver includes tuning, intermediate frequency amplifying and detecting stages. A search mechanism, for example, a search motor, is provided for varying the tuned frequency of the tuning stage. When the 19 KHz. pilot signal from a stereo broadcast is received, a first output signal is provided. Also, when the output of the intermediate frequency amplifying stage is of a sufficient amplitude at the predetermined intermediate frequency of the receiver, a second output signal is provided. The first output, indicative of the reception of a stereo broadcast, and the second output, indicative that the receiver is tuned to the carrier frequency of the stereo station, are applied to a coincidence circuit which supplies an output to the search mechanism which stops the tuning operation at the frequency of the received stereo broadcast. Automatic frequency control is supplied to the tuning stage as the search mechanism is stopped for fine tuning the receiver to the received stereo broadcast.

WITNESSES

Theodore F. Wrobel

James F. Young

INVENTOR

Dirk J. Boomgaard

BY Samuel O. Li

ATTORNEY

SIGNAL SEEKING FM STEREO SYSTEM

BACKGROUND OF THE INVENTION

1. Field of the Invention

The present invention relates to signal seeking systems for use in radio receivers and, more particularly, to signal seeking systems for use with FM stereo multiplex receivers.

2. Discussion of the Prior Art

In a signal seeking system for use in radio receivers, it is necessary to search for a signal which provides enough information to determine whether a desired station is being received or not. Normally in an AM or FM receiver it is sufficient to sense the presence of a carrier and in response thereto to stop the seeking mechanism. Depending upon the accuracy of the seeking system, it may be required to automatically fine tune the receiver, for example, by automatic frequency control (AFC). If one wishes to search only for FM stereo multiplex stations, it is required that a characteristic of the transmitted stereo multiplex signals be sensed. The 19 kHz. pilot signal transmitted as part of the composite FM stereo multiplex signal conventiently provides such a characteristic which may readily be sensed. In the receiver the 19 kHz. pilot signal is doubled to provide the 38 kHz. demodulating signals which are utilized in demultiplexing the composite stereo signals into its left and right channel components. Hence the 38 kHz. signal can also be utilized for terminating the search operation when the signal appears in the receiver in response to the 19 kHz. pilot signals. A signal seeking system for searching for FM stereo stations which utilizes the 19 kHz. pilot carrier for terminating the search operation is disclosed in U.S. Pat. No. 3,334,187, issued Aug. 1, 1967. In this patent the output of the FM detector of the receiver is applied to a circuit which senses the presence of a 19 kHz. pilot carrier, which is then detected, amplified, and utilized to activate a relay which terminates the search operation of a search motor.

The sole use of the 19 kHz. pilot signal or 38 kHz. demodulating signal to determine when the search operation is to be terminated has several disadvantages. First, the 19 kHz. pilot or 38 kHz. signal appears in the receiver as soon as the pilot carrier is detected in the detection stage of the receiver. A ratio detector is normally used as the detector stage; hence, detection will occur on the side slope of the S-curve of the ratio detector. Thus, when the pilot signal is first sensed, the tuned frequency of the receiver will not be at exactly the carrier frequency of the stereo broadcast being received. If the search operation is stopped at this frequency and if there is a strong signal from another adjacent station, not necessarily a stereo one, the automatic frequency control of the receiver can pull in the nondesired station and therefore miss the desired stereo station. Second, since the peak separation between the positive and negative peaks of the ratio detector depends of the signal strength, i.e., the amount of limiting, it is not possible to incorporate a fixed delay in the stopping of the search mechanism to insure that the stereo station is received. Third, another drawback of using only the 19 kHz. or 38 kHz. signals is that when these signals are detected after passing through the ratio detector three stops can occur for the same station since the detected signals (19 kHz. or 38 kHz.) will have zero amplitude response points at the positive and negative peaks of the S ratio detector characteristic. Three separate signals can then be generated capable of stopping the search mechanism of the signal seeking system depending upon the signal strength of the station received. If the search operation is stopped on one of the side lobes of the detected pilot or 38 kHz. signal, the AFC of the receiver may not be capable of fine tuning the reciever to pull in the desired tuned frequency for the stereo broadcast.

SUMMARY OF THE INVENTION

Broadly, the present invention provides a signal seeking system for use with a stereo FM receiver including tuning, intermediate frequency amplifying and detecting stages and wherein the tuned frequency of the tuning stage is varied until there is a coincidence of a signal indicating the presence of a pilot signal from a stereo broadcast and a signal indicating that the IF output of the intermediate amplifying stage is of sufficient amplitude for causing the variation of the tuned frequency of the receiver to be stopped.

DESCRIPTION OF THE PREFERRED EMBODIMENT

Figure 1:
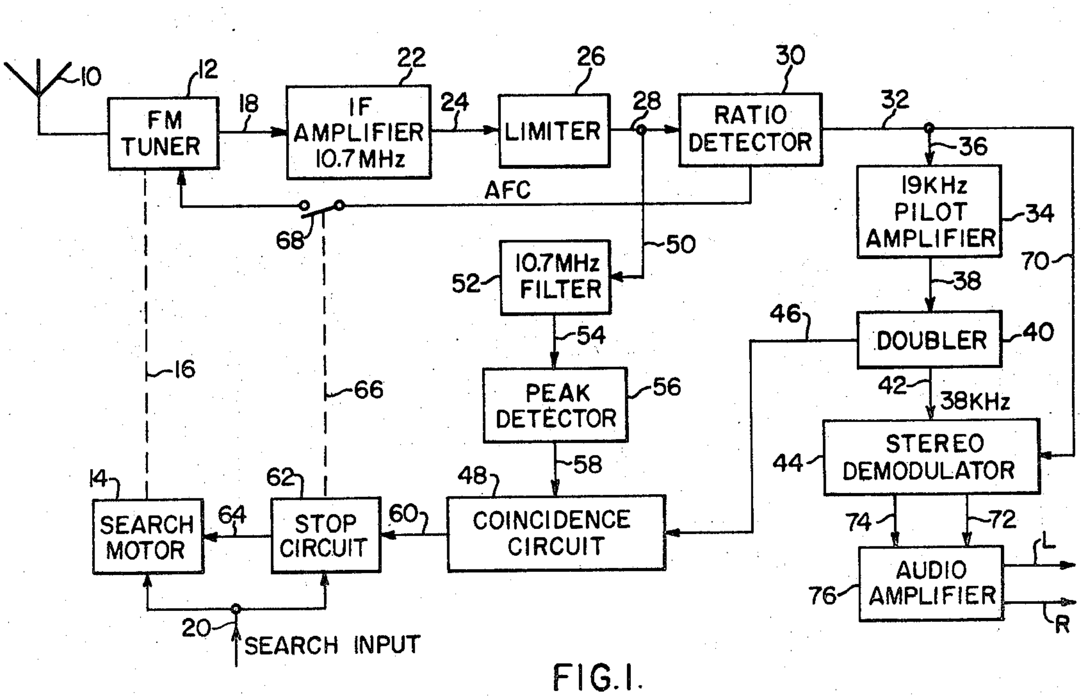
FIG. 1 is a schematic-block diagram of an FM stereo multiplex reciever employing the signal seeking system of the present invention.

The receiver as shown in FIG. 1 is designed for receiving FM stereo multiplex signals and demultiplexing these into the left L and right R channel audio components. A standard FM multiplex composite signal includes: (a) the sidebands of the difference combination L—R between the left and right audio frequency signals amplitude modulated on a suppressed carrier wave of 38 kHz.; (b) the sum combination L+R of the left and right audio frequency signals lying in a lower frequency band and (c) a pilot frequency at 19 kHz. disposed in the gap between the sum band and below the lower sideband of the difference band. The composite stereo signal is then frequency modulated on a carrier for transmission. The transmitted signal is received by an antenna 10 as shown in FIG. 1 and applied to an FM tuner 12 which includes IF amplifying, mixer and oscillator stages. To vary automatically the tuned frequency of the FM tuner 12 across the standard FM frequency band, a search motor 14 is mechanically which is mechanically coupled via a coupling 16 to the FM tuner 12. In response to the activation of the search motor 14, the mechanical coupling 16 causes the tuned frequency of the RF and oscillator stages of the FM tuner 12 to be varied, with the incoming signals being heterodyned to an intermediate frequency at output lead 18 of the FM tuner 12. The signal seeking operation is instigated by providing a search input via input 20 into the search motor 14 which is activated thereby to provide a mechanical output through the coupling 16 to the FM tuner 12 which in response thereto has its tuned frequency varied. The output 18 of the FM tuner is applied to an intermediate amplifier 22 which has its band pass centered about the standard intermediate frequency of 10.7 MHz. used in FM receivers. The IF amplified output is applied via a lead 24 to a limiter 26 which provides an amplitude limited output at its output 28 to a ratio detector 30.

Figure 2:
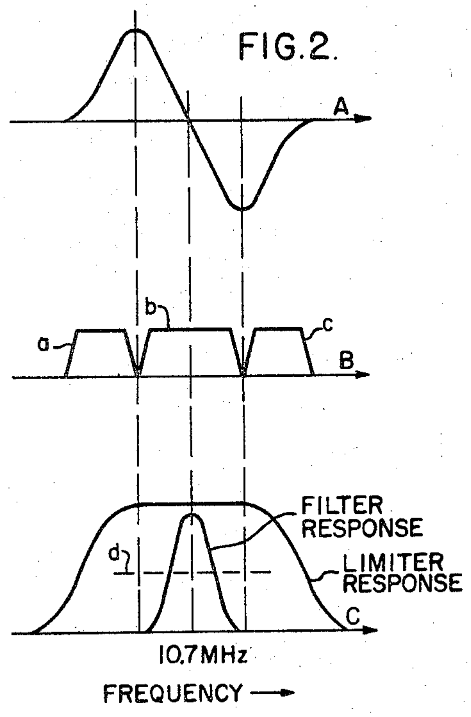
FIG. 2 is a waveform diagram including curves A, B and C used in explaining the operation of FIG. 1.

Referring also now to the curves of FIG. 2, the S-curve 18 characteristic of the ratio detector 30 is shown in curve A thereof. As shown in curve A the zero amplitude point of the S characteristic is the intermediate frequency of 10.7 MHz., the positive peak of the S characteristic being at a lower frequency and the negative peak being at a higher frequency. The amplitude of the signal output of the ratio detector 30 at its output 32 is thus dependent on the frequency of the input signals at input 28. Assuming that a stereo broadcast has been received including a 19 kHz. pilot signal in the composite stereo signal thereof, the pilot signal will be sensed in a 19 kHz. pilot amplifier 34 which receives the output 32 of the ratio detector 30 via an input 36. The amplified 19 kHz. pilot signal is applied to a doubler 40 which is operative to double the frequency of the 19 kHz. input thereto to provide a 38 kHz. demodulating signal at its output 42 which is applied to a stereo demodulator 44.

Figure 3:
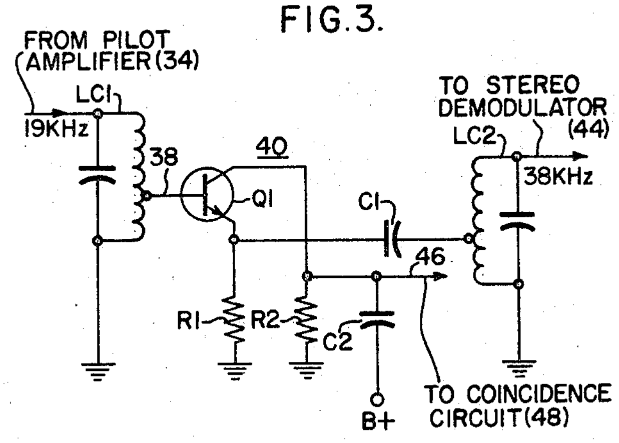
FIG. 3 is a schematic diagram of a portion of the system of FIG. 1.

The doubler 40 also has a 38 kHz. detected output appearing at an output 46 there of. The detected output 46 of the doubler 40 has a response curve as shown in curve B of FIG. 2. This detected output may ideally be developed as shown in the schematic of FIG. 3 of the doubler stage. The doubler circuit 40 as shown in FIG. 3 develops the 38 kHz. demodulating output at lead 42 and the stereo indicating output at the lead 46. The doubler circuit 40 includes a transistor Q1 which receives the 19 kHz. pilot output from a tuned circuit LC1 in the pilot amplifier 34, with the output of the 19 kHz. pilot amplifier being taken from a tap on the inductor of the tuned circuit LC1. This output is applied via the lead 38 to the base electrode of the transistor Q1. The emitter electrode of the transistor Q1 is coupled through an emitter resistor R1 to ground. The emitter electrode of transistor Q1 is also coupled via coupling capacitor C1 to a tap on the inductor of a 38 kHz. tuned circuit LC2. The tuned circuit LC2, which is tuned to the 38 kHz. desired demodulating frequency, supplies its 38 kHz. output at the lead 42 to the stereo demodulator 44. A positive operating potential B+ is supplied to the collector electrode of the transistor Q1 via a resistor R2. A filtering capacitor C2 is connected between the collector of the transistor Q1 and ground. When no pilot signal is being receiver the voltage at point 46 will be substantially B+ potential. However, whenever a pilot signal is being received, the transistor Q1 will be rendered conductive and the DC voltage at the point 46 developed across capacitor C2 will drop to a relatively low value (near ground potential) which may be utilized for triggering a coincidence circuit 48.

Curve B of FIG. 2 shows the response of the doubler 40 to be centered above the 10.7 MHz. intermediate frequency with zero amplitude nulls appearing at the peak response points of the ratio detector characteristic shown in curve A. This thus divides the response curve B into three portions *a*, *b* and *c*, with the center portion *b* being centered about the 10.7 MHz. IF. It should be noted that the response characteristic could be provided at the 19 kHz. level by detecting the 19 kHz. pilot signal in the pilot amplifier 34 and using this as an indication that a stereo station has been received. However, in the present embodiment, a detected output of the doubler 40 is utilized since this is at a more constant amplitude and more ideal for utilization in the embodiment of FIG. 1.

If the sensed presence of a pilot signal alone were utilized to stop the search operation of the search motor during the seeking of the FM tuner 12, it can be seen from the response curves of A and B of FIG. 2 that if the FM tuner were being scanned from a lower to a higher frequency that the search operation could be deactivated in the low frequency range of the portion *a* of curve B of FIG. 2 rather than in the desired portion *b* centered about the 10.7 MHz. IF intermediate frequency. This would cause a distorted output from the receiver. Even if AFC were applied to the FM tuner 12, it may be insufficient to cause the tuner to be brought into the desired 10.7 MHz. *b* portion, or it might cause the tuner to be adjusted to a strong adjacent station, which might not be a stereo station. Similarly, the search operation might be terminated in the frequency range of portion *c* of curve B of FIG. 2, which again would result in distorted reproduction and possible mistuning to an undesired nonstereo station. It can thus be seen by using solely the sensing of the 19 kHz. pilot signal, which is present in the output of the ratio detector 30 as soon as the pilot signal has been detected, the FM tuner may not be tuned to the center portion *b* of the response curve centered about the desired 10.7 MHz. intermediate frequency for the received stereo station. Hence a signal seeking system operating solely off the 19 kHz. pilot or the doubled 38 demodulating signal derived therefrom can cause mistuning to undesired nonstereo stations as well as the mistuning of a received stereo station, both of which is being highly undesirable.

In the present invention to ensure that the tuning of the FM tuner 12 is stopped at the proper tuned frequency for the incoming stereo broadcast another characteristic of the incoming signal is utilized in addition to the 19 kHz. or 38 kHz. signals. This characteristic is that the center frequency of the transmitted signal at IF is at 10.7 MHz. for correct tuning. Because the frequency response of the limiter 26 is relatively broad band and flat as shown in curve C, it is not possible to determine with any degree of certainty where the center frequency thereof is by peak detection. Thus, it is not feasible to use the output of the limiter 26 for stopping the search operation. However, the desired center frequency of 10.7 MHz. at correct tuning can be sensed by a narrow band filter peaked 10.7 MHz. coupled to the output 28 of the limiter 26.

The output 28 of the limiter 26 is applied via a lead 50 to a 10.7 MHz. filter 52, which is a high-Q filter peaked at 10.7 MHz. for transmitting therethrough a narrow band of frequency components centered about the 10.7 MHz. intermediate frequency. The 10.7 MHz. output of the filter 52 is applied via an output 54 to a peak detector 56 wherein the signals are peak detected and applied via an output 58 to the coincidence circuit 48. The coincidence circuit 48 is so designed that it will respond to the output 58 of the peak detector 56 when this output exceeds a predetermined amplitude level, such as shown by the horizontal dotted line *d* in curve C of FIG. 2, and if a signal is applied to the other input 46 of the coincidence circuit 48 from the doubler circuit 40 indicating that a stereo broadcast is being received. The coincidence of inputs 46 and 58 at the coincidence circuit 48 will cause it to provide an output 60 to a stop circuit 62, which, in response thereto, via an output 64, causes the search motor 14 to terminate the varying of the tuned frequency of the FM tuner 12, thereby ending the signal searching operation. The stop circuit 62 also in response to the output 60 from the coincidence circuit 48, causes a switch 68 to be closed via a mechanical coupling 66 to cause an automatic frequency control signal to be applied from the ratio detector 30 via the switch 68 to the FM tuner 12 to thereby automatically fine tune the FM tuner 12 to the exact carrier frequency of the FM stereo station. It should be noted that the signal seeking operation was not terminated until a sufficiently high amplitude intermediate frequency signal was developed indicating that the receiver was tuned to be in the frequency range portion *b* of the response curve of curve B of FIG. 2. Thus, the AFC may automatically fine tune the tuner 12 to the carrier frequency of the incoming stereo broadcast.

With the automatic tuning of the FM tuner 12 terminated and the AFC loop completed to the FM tuner 12, the receiver is in condition for demultiplexing the incoming FM multiplex signal. The composite output of the ratio detector 30 is applied via the lead 32 and a lead 70 to the stereo demodulator 44, and the 38 kHz. demodulating signal is applied via lead 42 to the stereo demodulator 44. The demodulator 44 is operative to demodulate the composite stereo signal at the lead 70 into its left and right channel components under the control of the 38 kHz. demodulating signals. The dual outputs 72 and 74 of the demodulator 44 are applied to an audio amplifier 76 which amplifies these signals to appear at its audio outputs L and R indicating the left and right channels, respectively, for application to sound reproduction devices such as electroacoustical loudspeakers. The stereo demodulator 44 may comprise a matrixing network for the demodulating of the stereo signals into the left and right channel components or may utilize a switching network. Both of these demodulating techniques are well-known known in the stereo receiving art.

When it is desired to tune automatically to another stereo station, a search input 20 is applied to the search motor 14 which causes the tuned frequency of the FM tuner 12 to be varied via the mechanica coupling 16. Also the input 20 is applied to the stop circuit 62 which, via the mechanical coupling 66, causes the switch 68 in the AFC loop to be opened thereby disconnecting the automatic frequency control signals from the FM tuner 12. The signal search operation then continues as described above. When a stereo FM multiplex signal is received including 19 kc. pilot signal, this will be converted in the FM tuner 12 to an intermediate frequency which is translated through the IF amplifier 22, the limiter 26 and the ratio detector 30, with the 19 kHz. pilot being sensed in the pilot amplifier 34 and doubled to 38 kHz. in the doubler 40. The output 46 of the doubler 40 is indicative of the presence of a pilot signal in the received composite signal and is applied to the coincidence circuit 48. As the FM tuner 12 is automatically tuned toward the carrier frequency of the incoming FM signal, the IF output of the IF amplifier 22 and limiter 26 increases in amplitude. The output of the limiter 28 is filtered in the filter 52, which is peaked at the 10.7 MHz. IF, and then peak detected in the peak detector 56 with the coincidence circuit 48 being activated thereby when the amplitude of the peak detected signal reaches a predetermined value. A coincidence of the inputs 58 and 46 to the coincidence circuit 48 causes an output 60 to be applied to the stop circuit 62 which terminates the search operation of the search motor 14 and causes the switch 68 to be closed closing the AFC loop to the FM tuner 12 from the ratio detector 30. The receiver as shown in FIG. 1 is thus automatically tuned and fine tuned to the incoming FM stereo broadcast.

Although the present invention has been described with a certain degree of particularity, it should be understood that the present disclosure has been made only by way of example and that numerous changes in the details of fabrication and that the combination and arrangement of parts, elements, and components can be resorted to without departing from the spirit and the scope of the present invention.

I claim:

1. In a stereo FM receiver including tuning, intermediate frequency amplifying and detecting stages, the combination of:
   search means for varying the tuned frequency of said tuning stage;
   stereo sensing means responsive to the detected output of said detecting stage for providing a first signal when a stereo broadcast is being received;
   IF sensing means responsive to the output of said intermediate amplifying stage for providing a second signal when the output of said intermediate amplifying stage reaches a predetermined amplitude;
   coincidence means responsive to said first and second signals for providing a third signal; and
   stop means for stopping said search means from varying the tuned frequency of said tuning stage at substantially the tuned frequency of said stereo broadcast.

2. The combination of claim 1 including: AFC means for applying automatic frequency control signals from said detector stage to said tuning stage in response to said third signal, with said tuning stage being fine tuned in response thereto to the tuned frequency of said stereo broadcast.

3. The combination of claim 2 wherein FM stereo multiplexed signals including a 19 kHz. pilot signal are being transmitted and wherein: said stereo sensing means includes means responsive to said pilot signal for generating said first signal.

4. The combination of claim 3 wherein: said IF sensing means includes filter means for passing signals at said intermediate frequency and substantially attenuating other frequencies.

5. The combination of claim 4 wherein: said IF sensing means includes peak detecting means for peak detecting the output of said filter means and providing said second signal.

6. The combination of claim 1 including: AFC means for applying automatic frequency control signals from said detecting stage to said tuning stage in response to said third signal, with said tuning stages being fine tuned in response thereto to the tuned frequency of said stereo broadcast.

7. The combination of claim 5 wherein said stereo sensing means includes:
   pilot amplifying means responsive to said 19 kHz. pilot signal for providing an amplified pilot output;
   doubler means responsive to said amplifier pilot output for providing said first signal as detected 38 kHz. signals and also providing demodulating 38 kHz. signals; and including
   stereo demodulating means responsive to the output of said detecting stage and said demodulating 38 kHz. signals for providing the stereo audio outputs of said receiver.